(12) United States Patent
Rork et al.

(10) Patent No.: US 8,193,923 B2
(45) Date of Patent: *Jun. 5, 2012

(54) AUTOMOTIVE VEHICLE AND ASSET MANAGEMENT SYSTEM THEREFOR

(75) Inventors: Joseph Paul Rork, Canton, MI (US);
Matthew Whitaker, Canton, MI (US);
Chiwei John Lee, Canton, MI (US);
Yitah Richard Wu, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 532 days.

This patent is subject to a terminal disclaimer.

(21) Appl. No.: 12/417,135

(22) Filed: Apr. 2, 2009

(65) Prior Publication Data

US 2010/0253473 A1    Oct. 7, 2010

(51) Int. Cl.
*B60Q 1/00* (2006.01)
(52) U.S. Cl. ............... 340/438; 340/425.5; 340/500; 340/572.1
(58) Field of Classification Search ............ 340/438
See application file for complete search history.

(56) References Cited

U.S. PATENT DOCUMENTS

| | | | |
|---|---|---|---|
| 6,331,817 B1 * | 12/2001 | Goldberg | ............ 340/573.1 |
| 7,123,149 B2 | 10/2006 | Nowak et al. | |
| 7,138,916 B2 | 11/2006 | Schwartz et al. | |
| 7,151,454 B2 | 12/2006 | Washington | |
| 7,176,801 B2 | 2/2007 | Matsukawa et al. | |
| 7,209,041 B2 | 4/2007 | Hines et al. | |
| 7,474,213 B2 | 1/2009 | Tsuboi | |
| 7,489,242 B2 | 2/2009 | Hines et al. | |
| 2002/0113706 A1 * | 8/2002 | Prado et al. | ............ 340/571 |
| 2003/0102970 A1 * | 6/2003 | Creel et al. | ............ 340/568.1 |
| 2004/0217864 A1 * | 11/2004 | Nowak et al. | ............ 340/572.1 |
| 2005/0052281 A1 * | 3/2005 | Bann | ............ 340/539.13 |
| 2005/0110639 A1 | 5/2005 | Puzio et al. | |
| 2005/0242971 A1 | 11/2005 | Dryer | |
| 2006/0139159 A1 * | 6/2006 | Lee et al. | ............ 340/457 |
| 2006/0193262 A1 | 8/2006 | McSheffrey et al. | |
| 2006/0255916 A1 * | 11/2006 | Cox | ............ 340/10.1 |
| 2007/0109096 A1 | 5/2007 | Breedlove | |
| 2008/0228346 A1 * | 9/2008 | Lucas et al. | ............ 701/33 |
| 2010/0250309 A1 * | 9/2010 | Pleet et al. | ............ 705/7 |

FOREIGN PATENT DOCUMENTS

WO    2009073255 A1    6/2009

OTHER PUBLICATIONS

International Search Report and Written Opinion as filed in PCT/US08/75004, mailed Nov. 18, 2008.

* cited by examiner

*Primary Examiner* — George Bugg
*Assistant Examiner* — Kerri McNally
(74) *Attorney, Agent, or Firm* — Frank MacKenzie; Brooks Kushman P.C.

(57) ABSTRACT

An automotive vehicle includes one or more computers. The one or more computers are configured to, in a first mode of operation, receive and store, at a plurality of instances, inventory information about assets in a vicinity of the vehicle, and identify patterns in asset inventories based on the inventory information and a history of vehicle locations associated with the inventory information. The one or more computers are also configured to, in a second mode of operation, generate output representing at least one suggested vehicle destination based on the identified patterns and assets detected in the vicinity of the vehicle.

13 Claims, 5 Drawing Sheets

| Date | Time | Location | Assets |
|---|---|---|---|
| 6/1/09 Monday | 7:58 am | Home | Computer |
| 6/2/09 Tuesday | 8:05 am | Home | Computer, Widget |
| 6/3/09 Wednesday | 7:42 am | Home | Computer |
| 6/4/09 Thursday | 8:15 am | Home | Computer, Widget |
| 6/5/09 Friday | 8:30 am | Home | Computer |

Job: Framing

Tools Required: Drill, Hammer, Level, Nail Gun

Location: Bed, Bed, Cabin

Missing Tools: Nail Gun

Fig-4

| ANTENNA | LOCATION |
|---|---|
| 14a | Front |
| 14b | Rear |
| 14c | Right Side |
| 14d | Left Side |
| 14e | Cabin |
| 14f | Bed |

Fig-5

Enter Tool: Drill

SCAN

Fig-6

| I.D. | DESCRIPTION |
|---|---|
| 3X1 | Drill |
| 4B2 | Hammer |
| 7C3 | Level |
| 2F9 | Nail Gun |
| 8Z8 | Trowel |
| ... | ... |

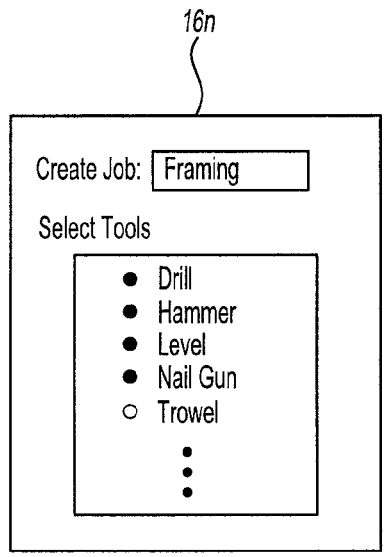
*Fig-7*
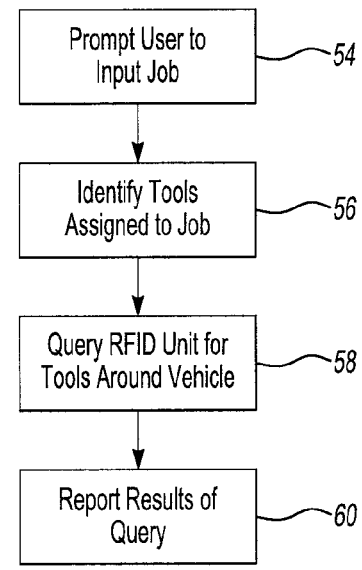
*Fig-9*
| DESCRIPTION | JOB |
|---|---|
| Drill | Framing, Drywall |
| Hammer | All |
| Level | All |
| Nail Gun | Framing |
| Trowel | Drywall |
| ⋮ | ⋮ |
*Fig-8*
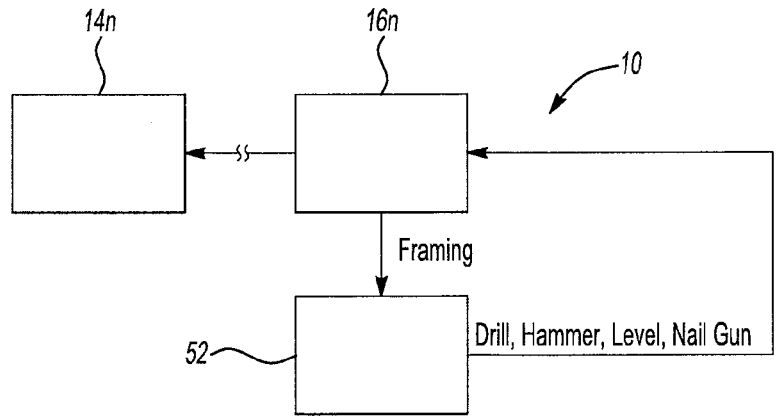
*Fig-10*

| Date | Time | Location | Assets |
|---|---|---|---|
| 6/1/09 Monday | 7:58 am | Home | Computer |
| 6/2/09 Tuesday | 8:05 am | Home | Computer, Widget |
| 6/3/09 Wednesday | 7:42 am | Home | Computer |
| 6/4/09 Thursday | 8:15 am | Home | Computer, Widget |
| 6/5/09 Friday | 8:30 am | Home | Computer |

AUTOMOTIVE VEHICLE AND ASSET MANAGEMENT SYSTEM THEREFOR

BACKGROUND

Several systems and techniques are known for electronically monitoring material assets. U.S. Pat. No. 7,151,454 to Washington, as an example, provides systems and methods that may be employed to visually locate and/or track objects equipped with active radio frequency identification (RFID) tags. The systems and methods may employ an articulated camera, such as closed circuit television or other suitable type of articulated camera, that is equipped with an antenna array.

U.S. Pat. No. 7,138,916 to Schwartz et al., as another example, provides a computerized system to inventory articles, and to locate and recover lost or stolen articles. The system applies an electronic tag to each article of a multiplicity of articles, or only to a valuable article, and employs a computer to maintain an inventory of all articles. Use is made of a global positioning system to locate a lost or stolen article as well as to track movements of the article. A history of the movement of the article may also be plotted on a map. An electronic geographic boundary area may also be placed around an article that can be used to emit a signal indicative of the article leaving the area.

U.S. Pat. No. 7,123,149 to Nowak et al., as yet another example, provides an integrated system for tracking assets and personnel associated with a work site. Personnel are equipped with tracking devices having at least geo-location capability. Assets are tagged with radio frequency identification (RFID) tags, which are interrogated at portals, by mobile scanners, or by personnel tracking devices having RFID reading capability. The tag readers and tracking devices are all in communication with a common "information backbone" and all data is delivered to, and processed by, a common command and control subsystem.

SUMMARY

An automotive vehicle includes one or more computers. The one or more computers are configured to, in a first mode of operation, receive and store, at a plurality of instances, inventory information about assets in a vicinity of the vehicle, and identify patterns in asset inventories based on the inventory information and a history of vehicle locations associated with the inventory information. The one or more computers are also configured to, in a second mode of operation, generate output representing at least one suggested vehicle destination based on the identified patterns and assets detected in the vicinity of the vehicle.

An automotive vehicle includes one or more radio frequency receivers configured to detect signals generated by activated wireless identification tags in a vicinity of the vehicle. The signals represent identifiers embedded in the wireless identification tags. The vehicle also includes one or more computers in communication with the receivers. The one or more computers are configured to, in a first mode of operation, record occurrences of detected identifiers, and identify a set of two or more tags based on the recorded occurrences. The two or more tags having been together within the vicinity of the vehicle on more than a predetermined number of occasions. The one or more computers are also configured to, in a second mode of operation, determine whether a particular detected tag belongs to the identified set, and determine whether other tags belonging to the identified set are also detected in the vicinity of the vehicle.

While example embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 2 is a schematic diagram of an example user interface of the system of FIG. 1.

FIG. 4 depicts an example data structure used by the system of FIG. 1.

FIG. 5 is a schematic diagram of another example user interface of the system of FIG. 1.

FIG. 6 depicts another example data structure used by the system of FIG. 1.

FIG. 7 is a schematic diagram of yet another example user interface of the system of FIG. 1.

FIG. 8 depicts yet another example data structure used by the system of FIG. 1.

FIG. 9 is a flow chart depicting an embodiment of an algorithm for selecting and tracking assets.

FIG. 10 is a schematic diagram illustrating the flow of data during the execution of a portion of the algorithm of FIG. 9.

DETAILED DESCRIPTION

Figure 1:
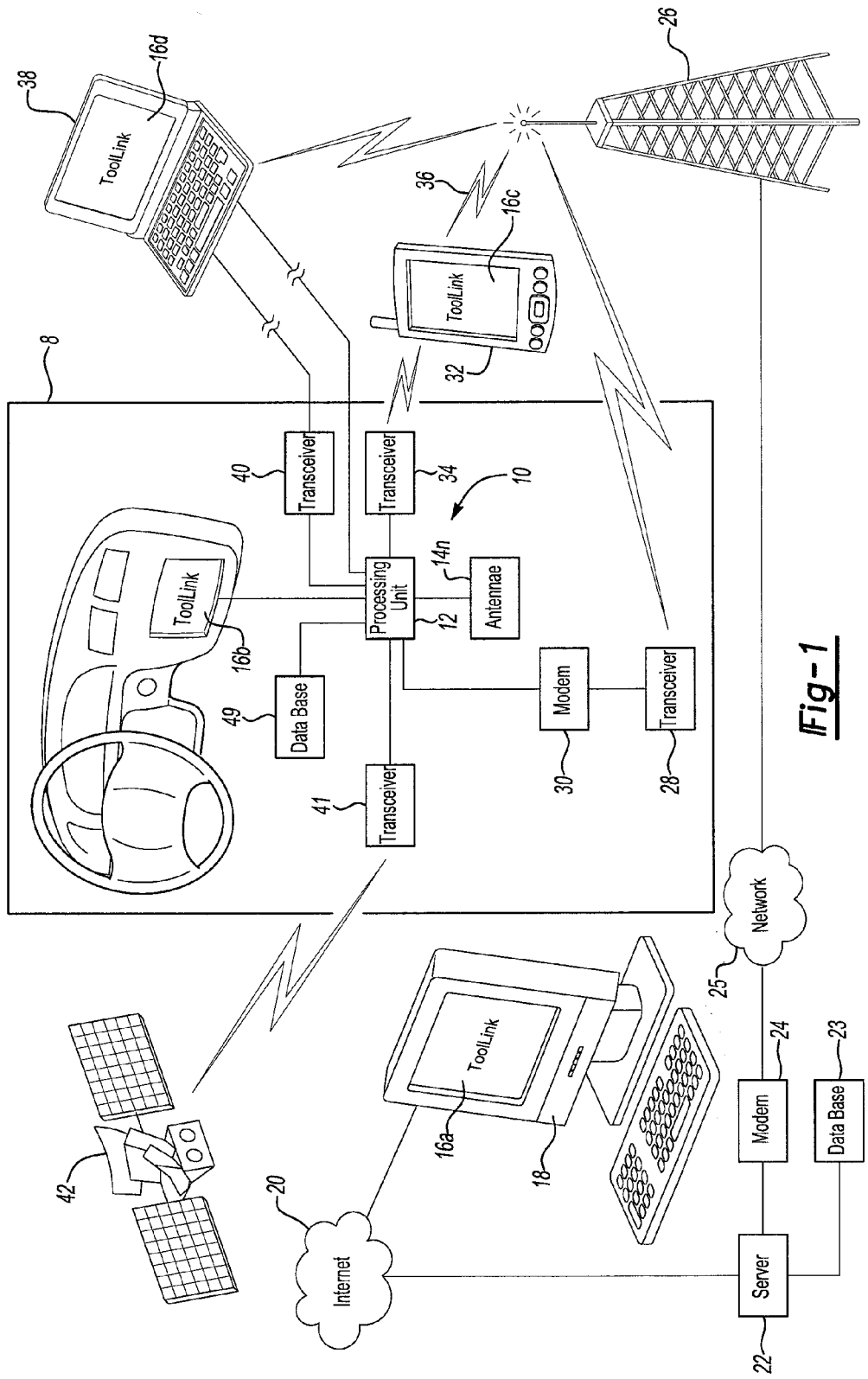
FIG. 1 is a schematic diagram of an embodiment of an asset management system.

Referring now to FIG. 1, a vehicle 8 includes an asset selecting and tracking system 10. The system 10 includes a computer data processing unit 12 in communication with antennae 14n. A receiver, transmitter or transceiver (not shown) may be the interface between the processing unit 12 and antennae 14n. (As used herein, a transceiver may include a receiver and a transmitter.) The antennae 14n enable communication with wireless asset tracking technology. As an example, under the command of the processing unit 12, the antennae 14n may generate signals in the radio frequency spectrum. The signals may excite circuitry in the form of radio frequency identification (RFID) tags affixed to various assets, e.g., tools, computers, sports equipment, etc. The excited circuitry may generate response signals in the radio frequency spectrum for detection by the antennae 14n and processing by the processing unit 12.

In some embodiments (such as the embodiment of FIG. 1), the processing unit 12 and antennae 14n reside within a vehicle. In other embodiments, the processing unit 12 resides within a vehicle and the antennae 14n reside within a trailer, tool box or other location remote from the vehicle. In still other embodiments, the processing unit 12 resides within a location remote from the vehicle and the antennae 14n reside within the vehicle. Other arrangements are also possible.

A computer 18 and the system 10 may communicate via a communication link facilitated by an Internet 20, server 22, network 25 (such as the public switched telephone network or PSTN), cellular network 26, cellular transceiver 28 and modem(s) 30. As an example, information from the computer 18 passes through the Internet 20 before it is received at the server 22. The server 22 is configured with software that permits the computer 18 to access the system 10. The server 22 stores and retrieves data from a database 23. Information from the server 22 may be transmitted to the cellular network 26 via the network 25. The cellular network 26 may then broadcast the information, depending on the communication technique. Signals received by the cellular transceiver 28 may be demodulated at the modem(s) 30 before processing by the processing unit 12.

A cell phone 32 and the system 10 may communicate via a communication link facilitated by a radio frequency transceiver 34, such as a BLUETOOTH transceiver. As an example, information transmitted by the cell phone 32 is received by the transceiver 34 and demodulated by the modem(s) 30 before processing by the processing unit 12. Outgoing information may also be communicated to the cellular network 26 via the cell phone 32 at link 36. Alternatively, the cellular transceiver 28 and modem(s) 30 may be integrated with the system 10 for communication with the cellular network 26.

A mobile computer 38 and the system 10 may communicate via a wireless communication link facilitated by the transceiver 34. As an example, information transmitted by the mobile computer 38 is received by the transceiver 34 and demodulated by the modem(s) 30 before processing by the processing unit 12. As another example, the mobile computer 38 and the system 10 may communicate over a hard wire communication link via ETHERNET or Universal Serial Bus (USB).

The system 10 may be accessed from any of example interfaces 16a-16d associated with the computer 18, vehicle 8, cell phone 32 and mobile computer 38 respectively. As an example, a foreman accessing the system 10 via the interface 16a may query the vehicle 8 as to its location. The system 10 may access an on-board navigation system that includes a receiver 41 capable of receiving signals from a satellite 42 that permit the processing unit 12 to determine its geographic location based on the received signals. The system 10 then responds to the query from the foreman with the geographic location information. The foreman may then assign a job to a construction crew using (or otherwise associated with) the vehicle 8. In response, the system 10 performs a scan of the vehicle 8 to determine whether some or all required assets are present and/or missing. The system 10 informs the foreman of the presence of the assets. Alternatively, the system 10 may inform the construction crew, via the interface 16b, of present/missing assets, or instruct the crew to acquire the missing assets. The system 10 may also inform a supervisor, via the interface 16c, that the foreman has assigned the construction crew using the vehicle 8 a particular job, and that the vehicle 8 includes or is missing certain assets required to perform the job.

As another example, a crew chief accessing the system 10 via the interface 16b may query a fleet of vehicles, each equipped with its own asset selecting and tracking system, regarding whether they have the required assets to perform a selected job. In response, each of the fleet vehicles performs its own scan of the assets within its vicinity and reports the results of the scan to the server 22 for access by the crew chief via the interface 16b.

As still yet another example, a construction worker accessing the system 10 via the interface 16b may select a job to be performed that day. The selected job information is communicated to a remote processing unit, such as the server 22, via the communication techniques described above. The server 22 determines the required assets for the job. The required asset information is then communicated to the vehicle 8 along with a command to activate the antennae 14n to scan the vehicle 8. The results of the scan are communicated back to the server 22. The server 22 determines if any required assets are missing. This information is communicated to the vehicle 8 and displayed via the display 16b. Other scenarios are also possible.

The system 10 may identify assets for a selected job and monitor whether those assets are within a vicinity of the antennae 14n. If any of the assets within the vicinity of the antennae 14n "leave" the vicinity of the antennae 14n, the system 10 may alert a user. As an example, the system 10 may send a message to the cell phone 32, either by the cellular network 26 or BLUETOOTH, indicating that a tool has left the vicinity of the antennae 14n. As another example, the system 10 may activate an alarm system associated with the vehicle 8. As yet another example, a paging signal may be communicated to a key fob (not shown) associated with the vehicle 8.

The system 10 may also periodically inventory the assets that are within a vicinity of the antennae 14n and compare that inventory to inventories taken at other times. If the system 10 detects differences between the inventories, the system 10 may alert a user. As an example, the system 10 may send a message to the computer 18 indicating that there are differences between an earlier and later performed inventory. This may be performed, for example, when leaving a job site to ensure that no tools are inadvertently left behind The system 10 may further record the geographic location of the vehicle 8 when the inventory occurred using information from the navigation system discussed above. As explained below, certain embodiments of the system 10 may use this location and inventory information to learn which assets are taken to particular locations. The system 10 may then suggest possible vehicle destinations based on the presence of certain assets within the vehicle 8 at, for example, vehicle start-up.

Inventories may be performed at specified intervals or upon the occurrence of specified events. As an example, a user may configure the system 10 to perform an inventory once every hour and at vehicle start-up. As another example, the system 10 may perform an inventory in response to a user pressing a button (not shown) on a key fob or console of the vehicle 8. Such configuration information may be entered via any of the interfaces 16a-16d.

Referring now to FIG. 2, a "Framing" job/task has been entered into one of the interfaces 16n. In response, the system 10 has identified a "Drill," "Hammer," "Level" and "Nail Gun" as predefined assets required for the "Framing" job/task. The system 10 has also identified that the "Drill" and "Hammer" are currently located in a "Bed" of the vehicle 8 and that the "Level" is currently located in a "Cabin" of the vehicle 8. The system 10 has further identified that the "Nail Gun" is missing.

In other embodiments, the information of FIG. 2 may be displayed for multiple vehicles. As an example, a user of the computer 18 may access a fleet of vehicles equipped with asset selecting and tracking systems, such as the system 10 of FIG. 1, to assign jobs/tasks, and query each vehicle as to whether it has the required assets to perform the assigned job/task. The server 22, acting as a communication hub with the fleet of vehicles, collects the asset information from each of the fleet vehicles and stores it in the database 23. The server 22 may then create a master view of the fleet vehicles on a single screen, e.g., the display 16a, that shows, for each vehicle, the assigned job/task and required, present and missing asset information.

Figure 3:
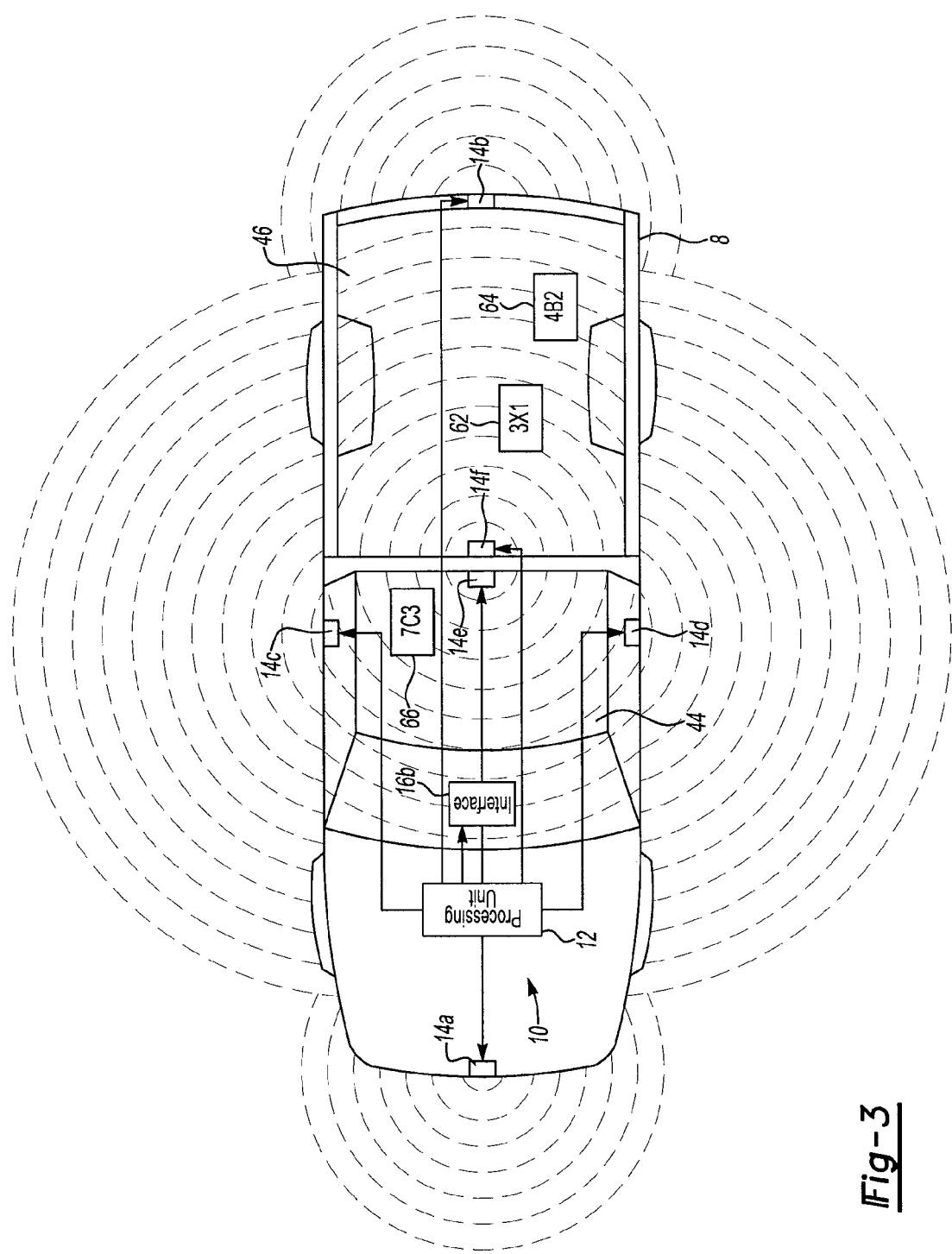
FIG. 3 is another schematic diagram of the system of FIG. 1.

Referring now to FIG. 3, the antennae 14a-14f are positioned throughout the vehicle 8. The antennae 14a and 14b are positioned to monitor the front and rear of the vehicle 8 respectively. The antennae 14c and 14d are positioned to monitor respective sides of the vehicle 8. The antenna 14e is positioned to monitor a cabin 44 of the vehicle 8. The antenna 14f is positioned to monitor a bed 46 of the vehicle 8. In other embodiments, the antennae 14n may be positioned as desired. As an example, one of the antennae 14n may be removed from the vehicle 8 and placed, for example, at a work site.

Referring now to FIG. 4, a data structure 48 stored within a memory 49 of the processing unit 12 maps each of the antennae 14n with a respective location about the vehicle 8 (or jobsite, if remote antennae are used). In the example of FIG. 4, the antenna 14a monitors the front of the vehicle 8, the antenna 14b monitors the rear of the vehicle 8, and so on. The data structure 48 allows the system 10 to translate between a signal received from one of the antennae 14n and its location about the vehicle 8.

Referring again to FIG. 3, the antennae 14n have a communication module for communicating with the processing unit 12 via a controller area network (CAN). Commands from the processing unit 12 and responses from the antennae 14n are broadcast on the CAN for receipt by the antennae 14n and processing unit 12 respectively. In other examples, the processing unit 12 and antennae 14n may communicate directly via a hard wire connection. In still other examples, the processing unit 12 and antennae 14n may communicate via a wireless connection. Such wireless connections may be particularly suitable for antennae 14n configured to be removed from the vehicle 8 and placed, for example, at a work site. Such wireless connections may also be particularly suitable for circumstances where the processing unit 12 is remote from the vehicle 8.

Referring now to FIG. 5, a set-up mode allows a user to configure the system 10 to recognize a certain set of assets tagged with wireless identification tags. The interface 16n prompts the user to enter a description of an asset with such a tag. In the example of FIG. 5, the user has entered "Drill." The user then places the "Drill" in the vehicle 8 and selects the "SCAN" button on the interface 16n. The user continues this process until all assets have been entered. In other embodiments, the interface 16n may prompt the user to enter a tagged asset and an identification code associated with the tagged asset, thus avoiding the scanning step. In still other embodiments, the user may be prompted to enter an identification code associated with a tagged asset and to select, from a list, a description of an asset to be associated with the identification code. Other configuration methods are also possible.

Referring now to FIG. 6, the system 10 creates a data structure 50 that maps each of the identification codes of the tags with its respective asset description as a result of the process described with reference to FIG. 5. The data structure 50 may be stored in the memory 49 of the processing unit 12. In the example of FIG. 6, the identification code "3X1" corresponds to the "Drill," the identification code "4B2" corresponds to the "Hammer," and so on. The data structure 50 allows the system 10 to translate between the identification codes and the asset descriptions.

Referring now to FIG. 7, the set-up mode also allows the user to configure the system 10 to identify assets necessary for a given job/task. The system 10 prompts the user, via the interface 16n, to enter a job/task. In the example of FIG. 7, the user has entered "Framing." The interface 16n provides a set of assets that may be selected by the user. The user has selected the "Drill," "Hammer," "Level" and "Nail Gun" by clicking on the circular fields provided. The user continues this process until all the jobs/tasks have been created. In other embodiments, the interface 16n may prompt the user to enter a job/task and a set of assets required for that job/task. In still other embodiments, the system 10 may be pre-loaded with a set of jobs/tasks and associated assets. These pre-loaded settings may be modified by the user. Other configuration methods are also possible.

Referring now to FIG. 8, the system 10 creates a data structure 52 that maps each of the asset descriptions with its respective job/task as a result of the process described with reference to FIG. 7. The data structure 52 is stored in the memory 49 of the processing unit 12 or alternatively, in the database 23 of the server 22 illustrated in FIG. 1. In the example of FIG. 8, the "Drill" corresponds to the jobs/tasks "Framing" and "Drywall," the "Hammer" corresponds to "All" jobs/tasks and so on. The data structure 52 allows the system 10 to translate between the asset descriptions and the jobs/tasks.

Referring now to FIG. 9, a user may access the system 10 to determine whether the assets required for a particular job/task are in a vicinity of the vehicle 8. At step 54 the user is prompted to input a job/task into the system 10. At step 56, the system identifies assets assigned to the job/task input at step 54. At step 58, the system inquires as to the assets in the vicinity of the vehicle 8. At step 60, results of the inquiry are reported to the user.

Referring now to FIG. 10, the job/task "Framing" has been input into the system 10 via the interface 16n. The system 10 identifies the assets required for the job/task "Framing" via the data structure 52. The system 10 also determines which assets, if any, are in a vicinity of the vehicle 8 by activating the antennae 14n.

Referring again to FIG. 3, the antennae 14n transmit signals (as indicated by dashed lines) capable of exciting circuitry associated with any wireless identification tags. In the embodiment of FIG. 3, tools 62, 64, 66 having tags with the identification codes "3X1," "4B2" and "7C3" respectively are in a vicinity of the vehicle 8. In response to the signals transmitted by the antennae 14n, circuitry associated with each of the tags of the tools 62, 64, 66 generate a response signal representing their identification code. As an example, the circuitry associated with the tag of the tool 62 generates a response signal representing the identification code "3X1."

As explained above, each of the antennae 14n are tuned to monitor a specified region about the vehicle 8. As an example, the antenna 14e is tuned to monitor the cabin 44 of the vehicle 8, and the antenna 14f is tuned to monitor the bed 46 of the vehicle 8. Because of the location of the tools 62, 64, 66, the antenna 14f receives the response signals generated by the tags of the tools 62, 64, and the antenna 14e receives the response signal generated by the tag of the tool 66.

Figures 11, 12:
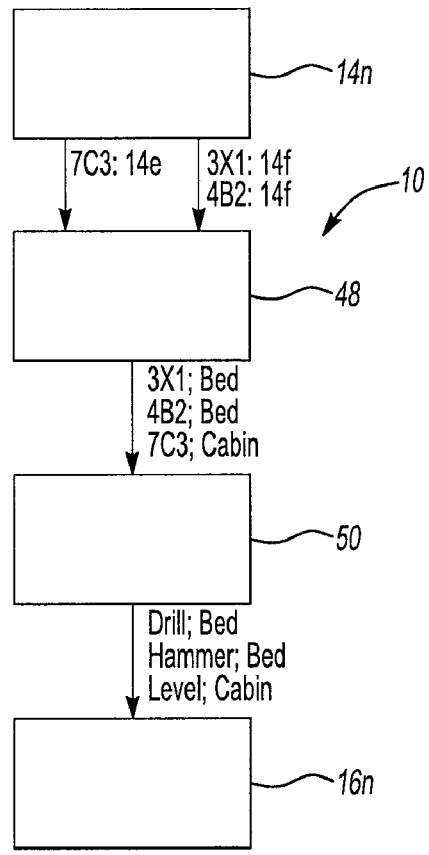
FIG. 11 is another schematic diagram illustrating the flow of data during the execution of another portion of the algorithm of FIG. 9.
FIG. 12 depicts still yet another example data structure used by the system of FIG. 1.

Referring now to FIG. 11, the system 10 determines the location associated with each of the response signals via the data structure 48. The system 10 also determines the description associated with each of the identification codes of the response signals via the data structure 50.

Referring again to FIGS. 2, 10 and 11, a comparison performed by the system 10 of the assets identified for the job/task "Framing", i.e., "Drill," "Hammer," "Level" and "Nail Gun," with the assets located in the vicinity of the vehicle 8, i.e., "Drill," "Hammer" and "Level," reveals that the "Nail Gun" is missing from the vehicle 8. The information regarding the assets is provided via the display 16n.

Referring again to FIG. 1, the system 10, in still other embodiments, may learn (while in a learning mode) which assets are typically in the vicinity of the vehicle 8 on particular days, times and/or locations. The system 10 may also learn, as mentioned above, which assets are typically taken to particular destinations, etc. This learning mode may be initiated via user input or other suitable initiation scheme. The system 10 may, for example, inventory assets in the vicinity of the vehicle 8 upon vehicle start-up (upon vehicle shut-down, upon user request, etc.) for a specified (e.g., user specified) number of days. The system 10 may then analyze this inventory information to identify asset patterns based on, for example, day, time and/or vehicle location, etc.

With such learned information, the system 10 may, for example, generate an alert if an asset expected to be in the vicinity of the vehicle 8 is missing. The system 10 may also suggest, via the navigation system discussed above, potential vehicle destinations based on the presence of a certain asset (or combination of assets).

Referring now to FIGS. 1 and 12, the system 10 has created an example data structure 68 capturing the date, time, location, and assets detected upon vehicle start-up during a five-day period. (Any suitable data collected during any suitable time period, however, may be used.) The data in this example reveals that (1) on Monday, Wednesday and Friday, "computer" is in the vicinity of the vehicle 8 (e.g., in the vehicle 8) upon vehicle start-up around 8:00 am (presumably the time at which the user leaves for work); and, (2) on Tuesday and Thursday, "computer" and "widget" are in the vicinity of the vehicle 8 (e.g., in the vehicle 8) around the same time. (As apparent to those of ordinary skill, location data may be obtained from the navigation system discussed with reference to FIG. 1; time and/or date data may be obtained from a clock internal to the vehicle 8 or the navigation system, etc. Of course, any suitable technique may be used to obtain such information.)

Pre-defined (or user defined) rules may be used, in certain embodiments, to identify asset patterns within the data structure 68. The rules may be preloaded in the system 10, or input via the interfaces 16$n$ and stored in a memory accessible by the processing unit 12. These patterns may reveal, for example, which assets are typically in the vicinity of the vehicle 8 during early weekday mornings, which assets are typically in the vicinity of the vehicle 8 on Saturday mornings, which assets are typically taken to work, and which sets of assets are typically taken to particular destinations, etc.

A first rule, for example, may be used to tally the number of times a given asset at a given location was detected during weekday mornings between the hours of 7:00 am and 9:00 am (other time periods and/or rules, of course, may also be used). In the example of FIG. 12, "computer" was detected five times and "widget" was detected two times. A second rule may be used to determine whether the number of times a given asset was detected exceeds a threshold (e.g., four times). In the example of FIG. 12, the number of times "computer" was detected (i.e., five) exceeds the example threshold (i.e., four). The system 10 has thus learned (or expects) that on weekday mornings between the hours of 7:00 am and 9:00 am, when the vehicle 8 is "home," "computer" should be in the vicinity of the vehicle 8. If on a subsequent Monday (when the system 10 is no longer in learning mode) between the hours of 7:00 am and 9:00 am, "computer" is not detected in the vicinity of the vehicle 8 (and the vehicle 8 is "home"), the system 10 may generate an alert, using any suitable technique, to inform the user via the interfaces 16$n$ that "computer" is missing (upon, for example, vehicle start-up).

Destination data (from the navigation system discussed above) may also be recorded in a data structure similar to the data structure 68 of FIG. 12 so that the system 10 may learn which assets are taken to certain destinations. (The system 10 may also simply track destination and assets detected, etc., while in learning mode.) In the example above, the day, time, vehicle location, and detected assets are recorded in the data structure 68 upon vehicle start-up. Assuming that the vehicle location at subsequent vehicle shut-down was also recorded (and assuming that location was "work"), rules similar to those discussed above could be constructed to allow the system 10 to learn that "computer" is normally taken to "work." For example, a rule may be used to tally the number of times a given asset was taken to "work" during five consecutive weekdays. Another rule may be used to determine whether the number of times a given asset was taken to "work" exceeds a threshold. If, when the system 10 is no longer in learning mode, "computer" is missing when the user informs the navigation system that he is going to "work," the system 10 may generate an appropriate alert.

Rules may also be constructed that permit the system 10 to suggest a list of potential destinations based on assets that are detected in the vehicle 8. For example, as discussed above, once the system 10 has learned that "computer" is taken to "work," a rule may be constructed that prompts the user with a question, via the interface 16$n$, asking if the intended destination is "work" if "computer" is detected in the vehicle 8. As another example, if "golf clubs" are detected, a rule may be constructed to prompt the user with a question asking if "golf course" is the intended destination, etc. As yet another example, if the system 10 has learned that "golf clubs" and "golf shoes" are typically in the vehicle 8 at the same time, if "golf clubs" are placed in the vehicle 8 (but not "golf shoes"), the system 10 may warn the user that "golf shoes" are not in the vehicle 8. For example, a rule may tally the number of times two or more assets are in the vehicle 8 at the same time (on different occasions). A second rule may determine whether the number of times the two or more assets were in the vehicle 8 at the same time exceeds a threshold. A third rule may prompt the system 10 to determine if all of the two or more assets are detected in the vehicle 8 if any one of the two or more assets are detected. A fourth rule may prompt the system 10 to generate an alert identifying any of the two or more assets that are missing, etc.

Additional rules may be implemented to refine/augment the learning capabilities of the system 10. A rule, for example, may determine whether the user has input, via the interface 16$n$, a negative response to the alert mentioned above. If so, the system 10 may discontinue such alerts even if an asset expected to be in the vicinity of the vehicle 8 is absent. Other scenarios are also possible.

Analytical techniques may also be used, in other embodiments, to identify asset patterns. For example, the system 10 may implement a neural network that monitors data similar to that discussed with reference to FIG. 12 to learn, in a known fashion, which assets should be in the vicinity of the vehicle 8 during certain days, times and/or locations, which assets are typically in the vehicle 8 at the same time, etc.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An automotive vehicle comprising:
one or more radio frequency receivers configured to detect signals generated by activated wireless identification tags in a vicinity of the vehicle, the signals representing identifiers embedded in the wireless identification tags; and
one or more computers in communication with the receivers and configured to in a first mode of operation, record occurrences of detected identifiers for each of a plurality of detection events and identify a pattern of two or more identifiers being repeatedly detected during a same detection event for the plurality of detection events, wherein the two or more identifiers form a pattern set of identifiers, and in a second mode of operation, determine whether a detected identifier belongs to the pattern set of identifiers and determine whether other identifiers belonging to the pattern set of identifiers have also been detected in the vicinity of the vehicle.

2. The vehicle of claim 1 wherein the one or more computers are further configured to, in the second mode of operation, generate output representing an alert if any of the other identifiers belonging to the pattern set of identifiers are not detected in the vicinity of the vehicle.

3. The vehicle of claim 2 wherein the output includes information identifying the other identifiers not detected in the vicinity of the vehicle.

4. The vehicle of claim 1 wherein the one or more computers are further configured to record, by date, occurrences of detected identifiers.

5. The vehicle of claim 1 wherein the one or more computers are further configured to record, by time, occurrences of detected identifiers.

6. The vehicle of claim 1 wherein the one or more computers are further configured to record, by vehicle location, occurrences of detected identifiers.

7. An asset management system comprising:
one or more radio frequency transmitters configured to generate activation signals for wireless identification tags affixed to assets in a vicinity of the one or more transmitters;
one or more radio frequency receivers configured to detect signals generated by activated wireless identification tags in the vicinity of the one or more transmitters, the signals representing identifiers embedded in the wireless identification tags; and
one or more computers in communication with the transmitters and receivers and configured to
in a first mode of operation, record occurrences of detected identifiers for each of a plurality of detection events and identify a pattern of two or more identifiers being repeatedly detected during a same detection event for the plurality of detection events, wherein the two or more identifiers form a pattern set of identifiers, and
in a second mode of operation, determine whether a detected identifier belongs to the pattern set of identifiers, determine whether other identifiers belonging to the pattern set of identifiers have also been detected in the vicinity of the one or more receivers, and generate output representing an alert if any of the other identifiers belonging to the pattern set of identifiers are not in the vicinity of the one or more receivers.

8. The system of claim 7 wherein the one or more computers are further configured to record, by date, occurrences of detected identifiers.

9. The system of claim 7 wherein the one or more computers are further configured to record, by time, occurrences of detected identifiers.

10. The system of claim 7 wherein the one or more receivers are positioned on or within a vehicle.

11. The system of claim 10 wherein the one or more computers are further configured to record, by vehicle location, occurrences of detected identifiers.

12. The system of claim 7 wherein the one or more computers are further configured to activate the one or more transmitters upon vehicle start-up.

13. The system of claim 7 wherein the one or more computers are further configured to activate the one or more transmitters upon vehicle shut-down.

* * * * *